US009435275B2

(12) United States Patent
Takagi et al.

(10) Patent No.: US 9,435,275 B2
(45) Date of Patent: Sep. 6, 2016

(54) VEHICLE CONTROL APPARATUS

(75) Inventors: Masashi Takagi, Nagoya (JP); Shinya Kodama, Toyota (JP); Akihiro Kida, Toyota (JP); Motonari Obayashi, Susono (JP); Hiroshi Shimada, Mishima (JP); Akito Oonishi, Nagoya (JP); Takamasa Kitamura, Nagoya (JP); Michihito Shimada, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 260 days.

(21) Appl. No.: 14/128,930

(22) PCT Filed: Jul. 1, 2011

(86) PCT No.: PCT/JP2011/065160

§ 371 (c)(1),
(2), (4) Date: Dec. 23, 2013

(87) PCT Pub. No.: WO2013/005274

PCT Pub. Date: Jan. 10, 2013

(65) Prior Publication Data

US 2014/0136084 A1 May 15, 2014

(51) Int. Cl.
*G06F 19/00* (2011.01)
*F02D 29/02* (2006.01)
*F02D 11/10* (2006.01)

(52) U.S. Cl.
CPC ............ *F02D 29/02* (2013.01); *F02D 11/106* (2013.01); *F02D 2200/602* (2013.01); *F02D 2200/702* (2013.01)

(58) Field of Classification Search
CPC .. B60W 10/04; B60L 15/2009; B60T 8/175; B60K 2031/0091; F02N 11/08
USPC ........... 701/101, 103–106, 112–115, 54, 70, 701/83, 90, 93
See application file for complete search history.

(56) References Cited

U.S. PATENT DOCUMENTS

2003/0100403 A1* 5/2003 Kato .................... F16H 61/061 477/123
2005/0143221 A1* 6/2005 Kuwahara ........... F16H 61/0213 477/97

(Continued)

FOREIGN PATENT DOCUMENTS

CN 101535113 A 9/2009
JP 61-190135 A 8/1986

(Continued)

OTHER PUBLICATIONS

Communication dated Dec. 23, 2014, issued by the U.S. Patent and Trademark Office in corresponding U.S. Appl. No. 14/129,189.

(Continued)

*Primary Examiner* — John Kwon
(74) *Attorney, Agent, or Firm* — Sughrue Mion, PLLC

(57) ABSTRACT

A brake override system (BOS) (1) prioritizes braking when both an accelerator and a brake are operated simultaneously by reducing the required accelerator operation amount value that is used to control drive force so that it is lower than the actual accelerator operation amount. The BOS (1) thus achieves a balance between hill-start performance after operation by the BOS (1) is cancelled and stopping performance during operation of the BOS (1) by increasing the required accelerator operation amount value at the time at which the return of the required accelerator operation amount value to the actual accelerator operation amount is initiated when the simultaneous operation of the accelerator and the brake ends.

3 Claims, 7 Drawing Sheets

(56) References Cited

U.S. PATENT DOCUMENTS

| | | | | |
|---|---|---|---|---|
| 2009/0062068 | A1 | 3/2009 | Nakai et al. | |
| 2009/0258754 | A1 | 10/2009 | Uddin | |
| 2012/0271526 | A1 | 10/2012 | Oishi et al. | |
| 2012/0290179 | A1* | 11/2012 | Oishi | B60T 7/042 701/54 |
| 2012/0290188 | A1 | 11/2012 | Oishi et al. | |
| 2013/0024090 | A1* | 1/2013 | Minase | B60W 30/1882 701/102 |
| 2014/0039774 | A1 | 2/2014 | Kodama et al. | |

FOREIGN PATENT DOCUMENTS

| | | | |
|---|---|---|---|
| JP | 64-25435 | U | 2/1989 |
| JP | 3-258932 | A | 11/1991 |
| JP | 2000-27674 | A | 1/2000 |
| JP | 2005-207260 | A | 8/2005 |
| JP | 2007-132316 | A | 5/2007 |
| JP | 2008-63953 | A | 3/2008 |
| WO | 2011/074035 | A1 | 6/2011 |
| WO | 2013/005275 | A1 | 1/2013 |

OTHER PUBLICATIONS

Communication dated Sep. 29, 2015 from the Japanese Patent Office in counterpart application No. 2013-522614.

Notice of Allowance dated Jul. 17, 2015 issued by the U.S. Patent and Trademark Office in corresponding U.S. Appl. No. 14/129,189.

* cited by examiner

VEHICLE CONTROL APPARATUS

CROSS REFERENCE TO RELATED APPLICATIONS

This application is a National Stage of International Application No. PCT/JP2011/065160, filed on Jul. 1, 2011, the contents of all of which are incorporated herein by reference in their entirety.

FIELD OF THE DISCLOSURE

The present invention relates to a control device for a vehicle adopting a brake override system in which a brake is given priority at the time of simultaneous operation of an accelerator and the brake.

BACKGROUND OF THE DISCLOSURE

The adoption of the brake override systems (BOS) in which a brake is given priority at the time of simultaneous operation of an accelerator pedal and a brake pedal as seen in Patent Document 1 for example, in vehicles has made recent advancements. The BOS gives priority to the brake at the time of simultaneous operation of the accelerator and the brake by making a required accelerator operation amount used for controlling a drive force of the vehicle (for example, controlling a throttle opening degree of the engine) smaller than an actual accelerator operation amount, that is, an actual pressing amount of the accelerator pedal and by making the drive force of the vehicle smaller than a value that corresponds to the actual accelerator operation amount.

PRIOR ART DOCUMENTS

Patent Documents

Patent Document 1: Japanese Laid-Open Patent Publication No. 2008-063953

SUMMARY OF THE INVENTION

Problems That the Invention Is To Solve

Meanwhile, conceivable situations where the BOS is activated include such a situation that the vehicle is stopped with the accelerator and the brake thereof simultaneously operated on a slope. In this case, a predetermined acceleration cannot be achieved at a start if the drive force is excessively reduced while the BOS is operated.

Accordingly, it is an objective of the present invention to provide a control device for a vehicle capable of achieving both slope starting performance and stopping performance.

Means For Solving the Problems

To achieve the foregoing objective, the present invention provides a first control device for a vehicle, in which, at a time of simultaneous operation of an accelerator and a brake, the engine makes a required accelerator operation amount used for controlling a drive force smaller than an actual accelerator operation amount. At the time of starting a return of the required accelerator operation amount to the actual accelerator operation amount when the simultaneous operation is canceled, a specified amount of increase in the required accelerator operation amount is implemented.

In the foregoing configuration, the required accelerator operation amount is increased only by a specified amount at the time of starting the return of the required accelerator operation amount to the actual accelerator operation amount when the simultaneous operation of the accelerator and the brake is canceled. As a result, the drive force is increased along with cancellation of the BOS operation. Thus, according to the foregoing configuration, both slope starting performance and stopping performance are achieved.

To achieve the foregoing objective, the present invention provides a second control device for a vehicle, in which, at a time of simultaneous operation of an accelerator and a brake, the engine makes a required accelerator operation amount used for controlling a drive force smaller than an actual accelerator operation amount. At the time of starting a return of the required accelerator operation amount to the actual accelerator operation amount when the simultaneous operation is canceled, an increase in the required accelerator operation amount is implemented in accordance with a gradient of a road surface on which the vehicle is located.

To achieve the foregoing objective, the present invention provides a third control device for a vehicle, in which, at a time of simultaneous operation of an accelerator and a brake, the engine makes a required accelerator operation amount used for controlling a drive force smaller than an actual accelerator operation amount. At the time of starting a return of the required accelerator operation amount to the actual accelerator operation amount when the simultaneous operation is canceled, an increase in the required accelerator operation amount is implemented in accordance with acceleration in a vehicle front-rear direction acting upon the vehicle.

To achieve the foregoing objective, the present invention provides a fourth control device for a vehicle, in which, at a time of simultaneous operation of an accelerator and a brake, the engine makes a required accelerator operation amount used for controlling a drive force smaller than an actual accelerator operation amount. A degree of returning of the required accelerator operation amount to the actual accelerator operation amount when the simultaneous operation is canceled is changed in accordance with a gradient of a road surface on which the vehicle is located.

To achieve the foregoing objective, the present invention provides a fifth control device for a vehicle, in which, at a time of simultaneous operation of an accelerator and a brake, the engine makes a required accelerator operation amount used for controlling a drive force smaller than an actual accelerator operation amount. A degree of returning of the required accelerator operation amount to the actual accelerator operation amount when the simultaneous operation is canceled is changed in accordance with acceleration in a vehicle front-rear direction acting upon the vehicle.

To achieve the foregoing objective, the present invention provides a sixth control device for a vehicle, in which, at a time of simultaneous operation of an accelerator and a brake, the engine makes a required accelerator operation amount used for controlling a drive force smaller than an actual accelerator operation amount. A degree of decrease of the required accelerator operation amount at the time of the simultaneous operation is changed in accordance with a gradient of a road surface on which the vehicle is located.

A change in the degree of decrease of the required accelerator operation amount in accordance with the gradient of the road surface only needs to be made only when a vehicle speed is not more than a preset value.

To achieve the foregoing objective, the present invention provides a seventh control device for a vehicle, in which, at a time of simultaneous operation of an accelerator and a brake, the engine makes a required accelerator operation amount used for controlling a drive force smaller than an actual accelerator operation amount. A degree of decrease of the required accelerator operation amount at the time of the simultaneous operation is changed in accordance with acceleration in a vehicle front-rear direction acting upon the vehicle.

A change in the degree of decrease of the required accelerator operation amount in accordance with the acceleration in the vehicle front-rear direction only needs to be made only when a vehicle speed is not more than a preset value.

To achieve the foregoing objective, the present invention provides an eighth control device for a vehicle, in which, at a time of simultaneous operation of an accelerator and a brake, the vehicle reduces a drive force to a value smaller than a value corresponding to an actual accelerator operation amount. At the time of starting a return of the drive force to a value corresponding to the actual accelerator operation amount when the simultaneous operation is canceled, a specified amount of increase in the drive force is implemented.

To achieve the foregoing objective, the present invention provides a ninth control device for a vehicle, in which, at a time of simultaneous operation of an accelerator and a brake, the vehicle reduces a drive force to a value smaller than a value corresponding to an actual accelerator operation amount. At the time of starting a return of the drive force to a value corresponding to the actual accelerator operation amount when the simultaneous operation is canceled, an increase in the drive force is implemented in accordance with a gradient of a road surface on which the vehicle is located.

To achieve the foregoing objective, the present invention provides a tenth control device for a vehicle, in which, at a time of simultaneous operation of an accelerator and a brake, the vehicle reduces a drive force to a value smaller than a value corresponding to an actual accelerator operation amount. At the time of starting a return of the drive force to a value corresponding to the actual accelerator operation amount when the simultaneous operation is canceled, an increase in the drive force is implemented in accordance with acceleration in a vehicle front-rear direction acting upon the vehicle.

To achieve the foregoing objective, the present invention provides an eleventh control device for a vehicle, in which, at a time of simultaneous operation of an accelerator and a brake, the vehicle reduces a drive force to a value smaller than a value corresponding to an actual accelerator operation amount. A degree of returning of the drive force to a value corresponding to the actual accelerator operation amount when the simultaneous operation is canceled is changed in accordance with a gradient of a road surface on which the vehicle is located.

To achieve the foregoing objective, the present invention provides a twelfth control device for a vehicle, in which, at a time of simultaneous operation of an accelerator and a brake, the engine reduces a drive force to a value smaller than a value corresponding to an actual accelerator operation amount. A degree of returning of the drive force to a value corresponding to the actual accelerator operation amount when the simultaneous operation is canceled is changed in accordance with acceleration in a vehicle front-rear direction acting upon the vehicle.

To achieve the foregoing objective, the present invention provides a thirteenth control device for a vehicle, in which, at a time of simultaneous operation of an accelerator and a brake, the vehicle reduces a drive force to a value smaller than a value corresponding to an actual accelerator operation amount. A degree of reduction of the drive force at the time of the simultaneous operation is changed in accordance with a gradient of a road surface on which the vehicle is located.

A change in the degree of reduction of the drive force in accordance with the gradient of the road surface only needs to be made when a vehicle speed is not more than a preset value.

To achieve the foregoing objective, the present invention provides a fourteenth control device for a vehicle, in which, at a time of simultaneous operation of an accelerator and a brake, the vehicle reduces a drive force to a value smaller than a value corresponding to an actual accelerator operation amount. A degree of reduction of the drive force at the time of the simultaneous operation is changed in accordance with acceleration in a vehicle front-rear direction acting upon the vehicle.

A change in the degree of reduction of the drive force in accordance with the acceleration in the vehicle front-rear direction only needs to be made when a vehicle speed is not more than a preset value.

DETAILED DESCRIPTION OF THE PREFERRED EMBODIMENTS

First Embodiment

Hereinafter, a control device for a vehicle according to a first embodiment of the present invention will be described with reference to FIGS. 1 to 3.

Figure 1:
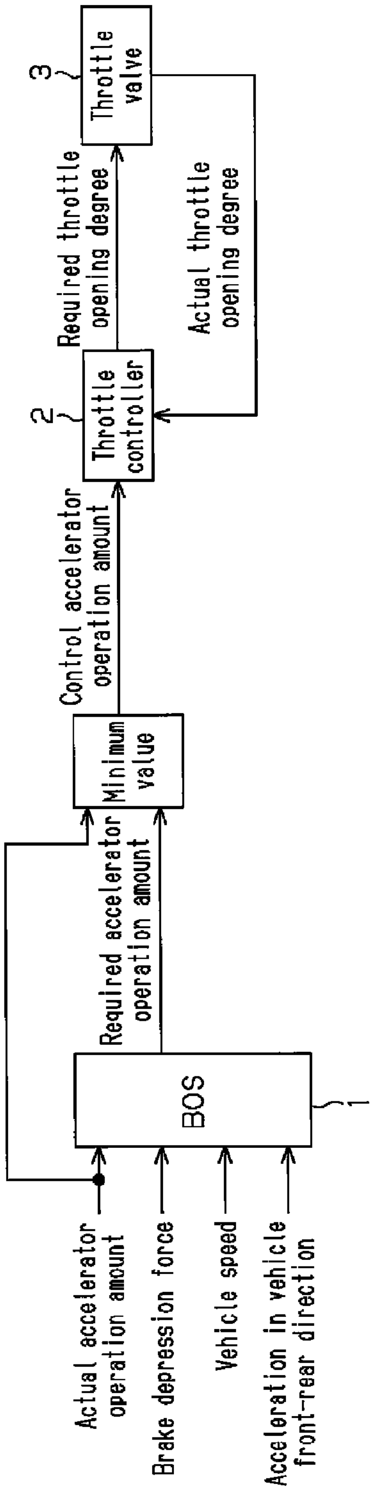
FIG. 1 is a simplified diagram schematically showing a configuration of a control device for a vehicle according to a first embodiment of the present invention.

As shown in FIG. 1, a vehicle employing a control device of the present embodiment is equipped with a brake override system (BOS) 1 as a control mechanism. The BOS 1 receives detection signals of an actual accelerator operation amount to be detected by an accelerator position sensor, a brake depression force to be detected by a brake depression force sensor, a vehicle speed to be detected by a vehicle speed sensor, and an acceleration in the vehicle front-rear direction to be detected by an acceleration sensor. The BOS 1 calculates a required accelerator operation amount and also outputs the calculated required accelerator operation amount. The BOS 1 normally calculates the required accelerator operation amount so as to take on the same value as the actual accelerator operation amount. On the other hand, the BOS 1 calculates the required accelerator operation amount so as to take on a value smaller than the actual accelerator operation amount at the time of simultaneous operation of the accelerator and the brake. By this, the BOS 1 performs BOS control of giving priority to the brake at the time of simultaneous operation of the accelerator and the brake.

To a throttle controller 2 controlling the throttle opening degree, the smaller value of the required accelerator operation amount having been calculated by the BOS 1 and the actual accelerator operation amount is input as a control accelerator operation amount. The throttle controller 2 then calculates a required throttle opening degree according to the control accelerator operation amount having been input and an actual throttle opening having been detected by the throttle position sensor, and controls the opening degree of a throttle valve 3 based on the value. By the control over the opening degree of the throttle valve 3, the output of the engine and furthermore the drive force of the vehicle are controlled.

Subsequently, the details of the calculation of the required accelerator operation amount by the BOS 1 will be described. The calculation of the required accelerator operation amount is performed through processing of a required accelerator operation amount calculation routine shown in FIG. 2. Further, the processing of the required accelerator operation amount calculation routine is configured to be performed by the BOS 1 repeatedly at every specified control cycle.

When the processing of this routine is started, first, whether the BOS 1 is currently operating in response to simultaneous operation of the accelerator and the brake, that is, whether the BOS control is being performed at step S100. If the BOS 1 is in operation (S100: YES), a calculation of the required accelerator operation amount corresponding to the vehicle speed is performed at step S101. The calculation of the required accelerator operation amount corresponding to the vehicle speed is performed with reference to a calculation map M1 showing a correspondence relationship between the vehicle speed and the required accelerator operation amount. After the calculation of the required accelerator operation amount, the processing of this routine this time is terminated.

When the BOS 1 is not in operation (S100: NO), on the other hand, whether the processing is in the course of returning from the BOS control, that is, whether the processing is in the course of returning of the required accelerator operation amount in response to cancellation of the simultaneous operation of the accelerator and the brake is determined at step S102. If the processing is in the course of returning from the BOS control here (S102: YES), the processing moves on to step S103. If not (S102: NO), the processing of this routine this time is terminated. If not in the course of returning, a value of the actual accelerator operation amount is set as a value of the required accelerator operation amount as it is.

When the processing moves on to step S103, a calculation of a basic required opening is performed at this step S103. As a value of the basic required opening to be calculated here, the smaller value of a value obtained by adding a returning gradient angle $\alpha$ having been set as a constant to the value of the required accelerator operation amount having been calculated at the previous control cycle and the actual accelerator operation amount is set.

In the following step S104, a calculation of a slope correction amount is performed in accordance with the vehicle speed. The calculation of the slope correction amount is performed with reference to a calculation map M2 showing a correspondence relationship between the vehicle speed and the slope correction amount. The slope correction amount is set at "0" when the vehicle speed is greater than or equal to a preset value. That is, the slope correction amount is calculated so as to take on a positive value only when the vehicle is at a stop or traveling at a creep speed.

At the following step S105, the larger value of the slope correction amount and the basic required opening is set as a value of the required accelerator operation amount. After that, the processing of this routine this time is terminated.

Next, operation of the present embodiment will be described with reference to FIG. 3.

Figure 3:
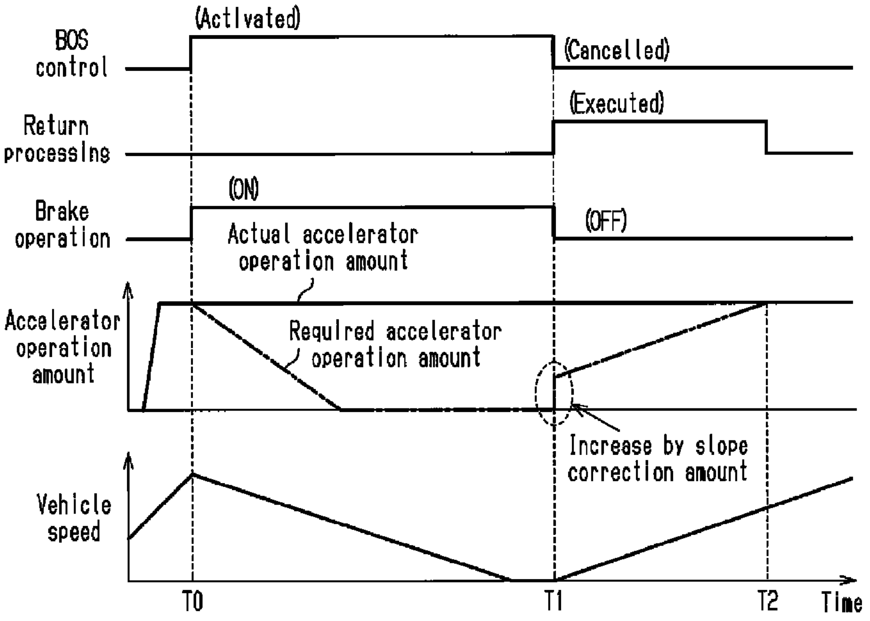
FIG. 3 is a time chart showing an example of control modes of the same embodiment.

A simultaneous operation of the accelerator and the brake is performed by starting a brake operation at time T0 of FIG. 3, whereupon the BOS control is started. Then, the required accelerator operation amount is reduced to a value smaller than the actual accelerator operation amount. By this, the throttle opening is made smaller, and the output of the engine and furthermore the drive force of the vehicle are made smaller than values corresponding to the actual accelerator operation amount, and the brake overrides the accelerator. Thus, the vehicle speed thereafter decreases.

At time T1, which is after the stopping of the vehicle, the brake operation is cancelled, and the BOS control is canceled, and then, a return processing for returning the reduced required accelerator operation amount to the actual accelerator operation amount is started. At this moment, in the present embodiment, the required accelerator operation amount is increased by the slope correction amount immediately after the start of the return processing, wherewith the drive force is ensured.

After that, the required accelerator operation amount is gradually increased. At the point of time when the required accelerator operation amount takes on the same value as the actual accelerator operation amount (time T2), the return processing of the required accelerator operation amount is terminated.

According to the foregoing present embodiment, the following advantages are achieved.

(1) In the present embodiment, a specified amount of increase in the required accelerator operation amount is implemented at the time of starting the return of the required accelerator operation amount to the actual accelerator operation amount when the simultaneous operation of the accelerator and the brake is canceled. By this, a specified amount of increase in the drive force is configured to be implemented at the time of starting the return of the drive force to a value corresponding to the actual accelerator operation amount when the simultaneous operation of the accelerator and the brake is canceled. As a result, the drive force can be increased immediately after the BOS control is cancelled, while the drive force during the operation of the BOS is made small. Therefore, according to the present embodiment, both slope starting performance and stopping performance can be achieved. Further, the present embodiment can be employed even when a means for checking the gradient of a road surface such as an acceleration sensor is not provided.

Second Embodiment

Next, a control device for a vehicle according to a second embodiment of the present invention will be described with reference to FIG. 4. In the first embodiment, the slope correction amount for increasing the drive force after the cancellation of the BOS control is configured to be calculated only in accordance with the vehicle speed. In this embodiment, however, such slope correction amount is configured to be variably set in accordance with the gradient of a road surface on which the vehicle is located.

Figure 2:
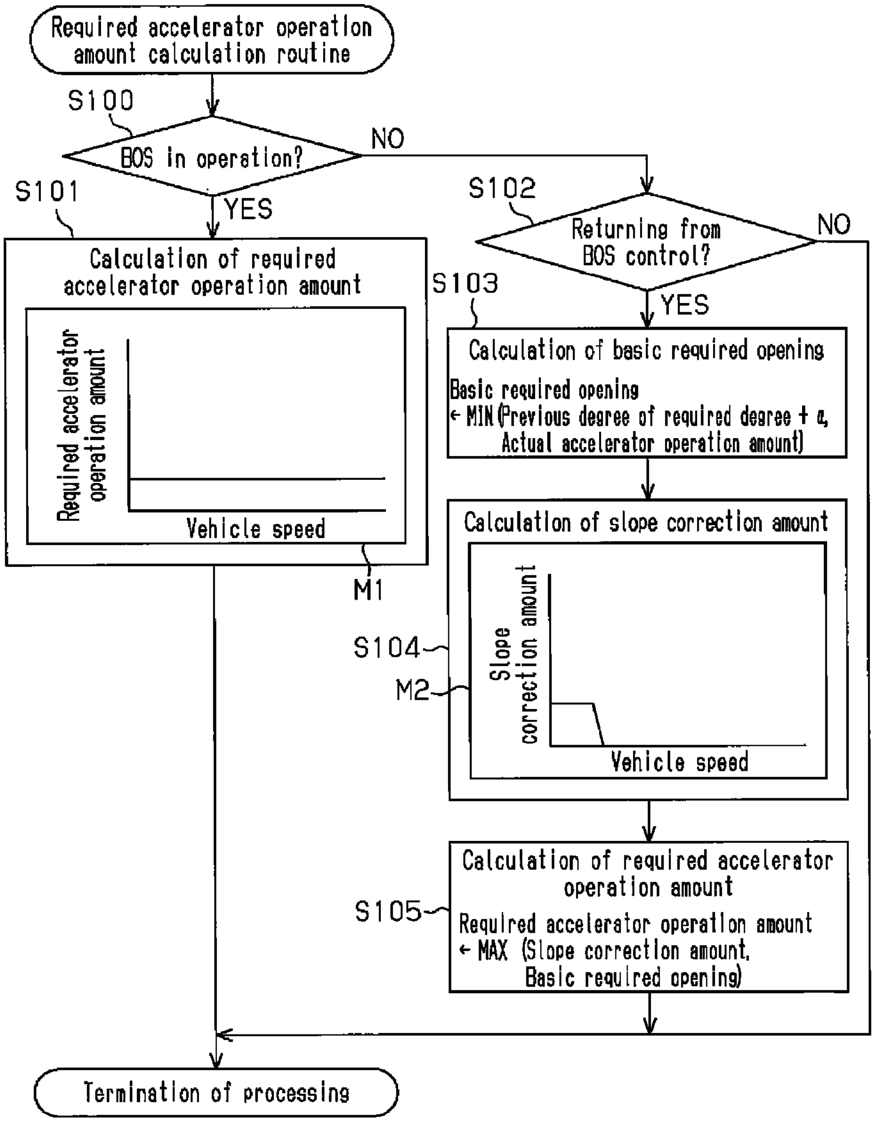
FIG. 2 is a flowchart showing a processing procedure of a required accelerator operation amount calculation routine employed in the first embodiment.
Figure 4:
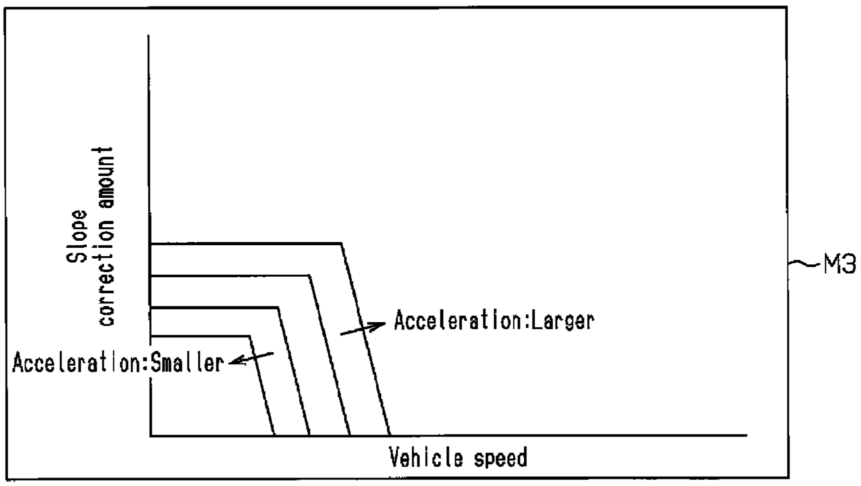
FIG. 4 is a graph showing a correspondence relationship among a vehicle speed, an acceleration in a vehicle front-rear direction, and a slope correction amount in a slope correction amount calculation map employed in a control device for a vehicle according to a second embodiment of the present invention.

That is, in the present embodiment, a calculation of the slope correction amount is performed with reference to a calculation map M3 shown in FIG. 4 at step S104 in the required accelerator operation amount calculation routine of FIG. 2. As shown in FIG. 4, the slope correction amount is set at a larger value as the acceleration in the vehicle front-rear direction acting upon the vehicle becomes larger. Here, the acceleration in the vehicle front-rear direction acting upon the vehicle is used as an index value of the gradient of the road surface on which the vehicle is located.

In the present embodiment, the larger the gradient of the road surface on which the vehicle is located, the larger an increased amount of the required accelerator operation amount, that is, an increased amount of the drive force, after the cancellation of the BOS control is performed. The drive force at that time becomes larger as the gradient of the road surface is larger. Thus, in the present embodiment, an increase in the drive force after the cancellation of the BOS control can be implemented in accordance with the gradient of the road surface, whereupon slope starting performance can be ensured more reliably.

Third Embodiment

Next, a control device for a vehicle according to a third embodiment of the present invention will be described with reference to FIGS. 5 and 6. In the foregoing embodiments, an increase in the required accelerator operation amount is implemented at the time of cancelling the BOS control, that is, at the time of starting the return processing of the required accelerator operation amount to the actual accelerator operation amount, thereby achieving both slope starting performance and stopping performance. In contrast, in the present embodiment, a degree of decrease of the required accelerator operation amount under the BOS control is configured to be changed in accordance with the gradient of the road surface, thereby achieving both slope starting performance and stopping performance.

Figure 5:
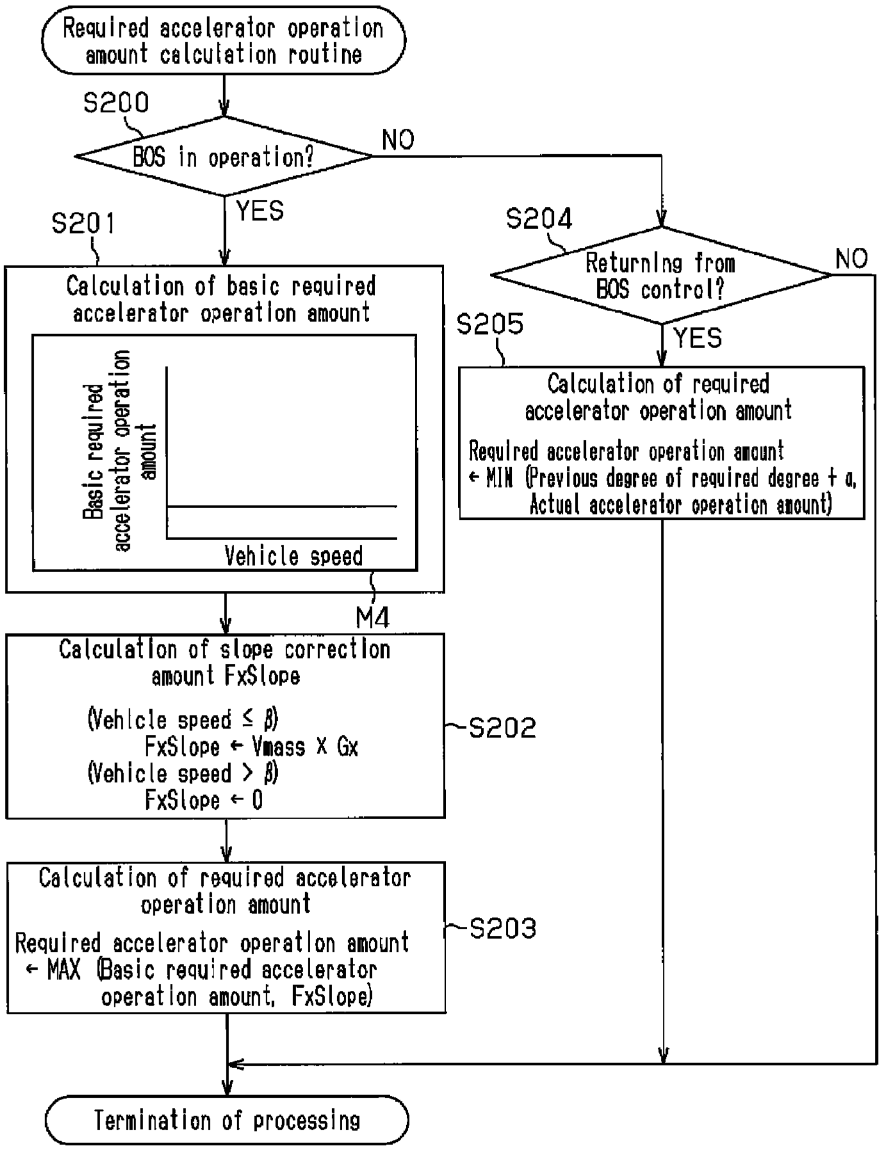
FIG. 5 is a flowchart showing a processing procedure of a required accelerator operation amount calculation routine employed in a control device for a vehicle according to a third embodiment of the present invention.

In the present embodiment, the BOS 1 calculates the required accelerator operation amount through processing of a required accelerator operation amount calculation routine shown in FIG. 5. Further, the processing of this routine is configured to be carried out by the BOS 1 repeatedly at every specified control cycle.

Once the processing of this routine is started, whether the BOS control is being performed, that is, whether the BOS 1 according to the simultaneous operation of the accelerator and the brake is in operation is determined first at step S200. If the BOS 1 is in operation here (S200: YES), a calculation of a basic required accelerator operation amount in response to the vehicle speed is performed at step S201. The calculation of the basic required accelerator operation amount is performed with reference to a calculation map M4 showing a correspondence relationship between the vehicle speed and the basic required accelerator operation amount.

Subsequently at step S202, a calculation of a slope correction amount F×Slope is performed. The slope correction amount F×Slope is calculated as a multiplication value of a vehicle weight Vmass by a detection value Gx of the acceleration in the vehicle front-rear direction by the acceleration sensor if the vehicle speed is not more than a preset value β and the vehicle is at a stop or traveling at a creep speed. On the other hand, if the vehicle speed exceeds the preset value β, the value of the slope correction amount F×Slope is made to be 0.

In the following step S203, the larger value of the basic required accelerator operation amount and the slope correction amount F×Slope is calculated as a value of the required accelerator operation amount. After that, the processing of this routine this time is terminated.

If the BOS 1 is not in operation (S200: NO), in contrast, whether the processing is in the course of returning from the BOS control, that is, whether the processing in the course of returning of the required accelerator operation amount in response to the cancellation of simultaneous operation of the accelerator and the brake is determined at step S204. If the processing is in the course of returning from the BOS control here (S204: YES), the processing moves on to step S205, and if not (S204: NO), the processing of this routine this time is terminated. Further, if not in the course of returning, a value of the actual accelerator operation amount is set as a value of the required accelerator operation amount as it is.

After the processing moves on to step S205, a calculation of the required accelerator operation amount is performed at this step S205. As a value of the required accelerator operation amount to be calculated, the smaller value of a value obtained by adding the returning gradient angle α having been set as a constant to the value of the required accelerator operation amount having been calculated at the previous control cycle and the actual accelerator operation amount is set. After that, the processing of this routine this time is terminated.

Next, operation of the present embodiment will be described with reference to FIG. 6.

Figure 6:
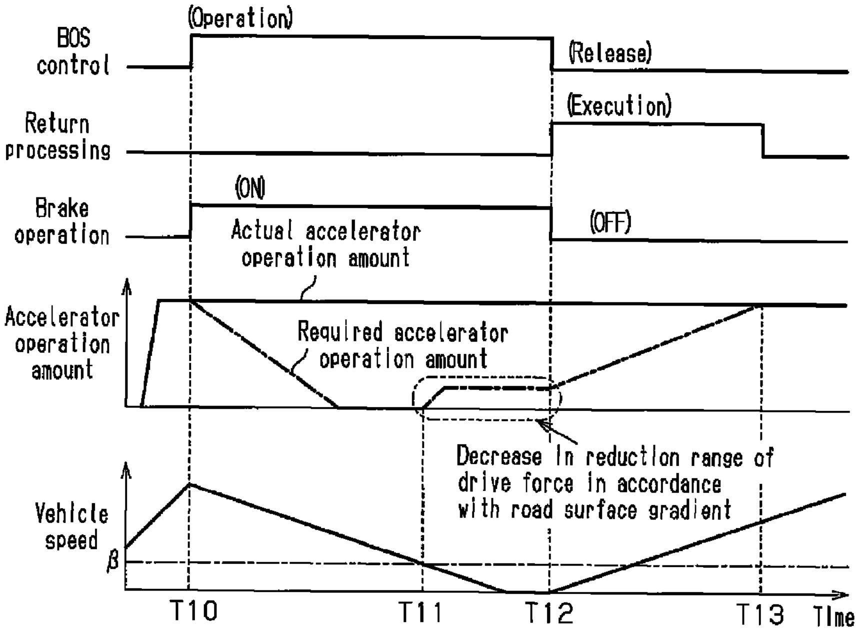
FIG. 6 is a time chart showing an example of control modes of the third embodiment.

After the simultaneous operation of the accelerator and the brake is performed and the BOS control is started by the start of brake operation at time T10 of FIG. 6, the required accelerator operation amount is reduced to a value smaller than the actual accelerator operation amount. With this, the throttle opening degree is decreased, and the output of the engine and furthermore the drive force of the vehicle are made smaller than values corresponding to the actual accelerator operation amount, and the brake overrides the accelerator. As a result, the vehicle speed decreases thereafter.

At time T11, at which the vehicle speed decreased to not more than the preset value 13, the acceleration in the vehicle front-rear direction, that is, the slope correction amount F×Slope corresponding to the road surface gradient is added to the required accelerator operation amount. This limits the degree of decrease of the required accelerator operation amount under the BOS control and furthermore the degree of reduction of the drive force under the BOS control, in accordance with the road surface gradient.

At the subsequent time T12, the brake operation is cancelled, and the BOS control is cancelled, and the return processing of the required accelerator operation amount to the actual accelerator operation amount is started. At this time, in the present embodiment, the return processing is started from the state in which the degree of decrease of the required accelerator operation amount under the BOS control is limited in accordance with the road surface gradient. Therefore, the drive force is ensured even just after the return processing is started.

After that, the required accelerator operation amount is gradually increased. At the point of time when the required accelerator operation amount takes on the same value as the actual accelerator operation amount (time T13), the return processing of the required accelerator operation amount is terminated.

According to the foregoing present embodiment, the following advantages are achieved.

(2) In the present embodiment, the degree of decrease of the required accelerator operation amount at the time of the simultaneous operation of the accelerator and the brake, that is, the degree of reduction of the drive force under the BOS control is configured to be changed in accordance with the road surface gradient having been learned from the acceleration in the vehicle front-rear direction. The drive force required at the time of a slope starting from the BOS control varies in accordance with the gradient of a road surface. Thus, changing the degree of reduction of the drive force under the BOS control in accordance with the road surface gradient can ensure the drive force under the BOS control and furthermore the drive force at the time when the BOS control is released. On the other hand, the degree of decrease of the required accelerator operation amount under the BOS control can be made larger on a flat road and a small gradient slope, and also stopping performance under the BOS control can be met. Thus, according to the present embodiment, both slope starting performance and stopping performance can be achieved.

(3) In the present embodiment, a change in the degree of decrease of the required accelerator operation amount corresponding to the road surface gradient under the BOS control, that is, a change in the degree of reduction of the drive force corresponding to the road surface gradient under the BOS control is made only when the vehicle speed is not more than the preset value β. In such cases, it becomes possible to make larger the degree of decrease of the required accelerator operation amount under the BOS control, that is, the degree of reduction of the drive force under the BOS control and to ensure stopping performance under the BOS control more reliably.

Fourth Embodiment

Subsequently, a control device for a vehicle according to a fourth embodiment of the present invention will be described with reference to FIGS. 7 and 8. In the present embodiment, a degree of returning of the required accelerator operation amount to the actual accelerator operation amount at the time when the simultaneous operation of the accelerator and the brake is canceled and the BOS control is released is changed in accordance with the road surface gradient having been learned from the acceleration in the vehicle front-rear direction, thereby achieving both slope starting performance and stopping performance.

Figure 7:
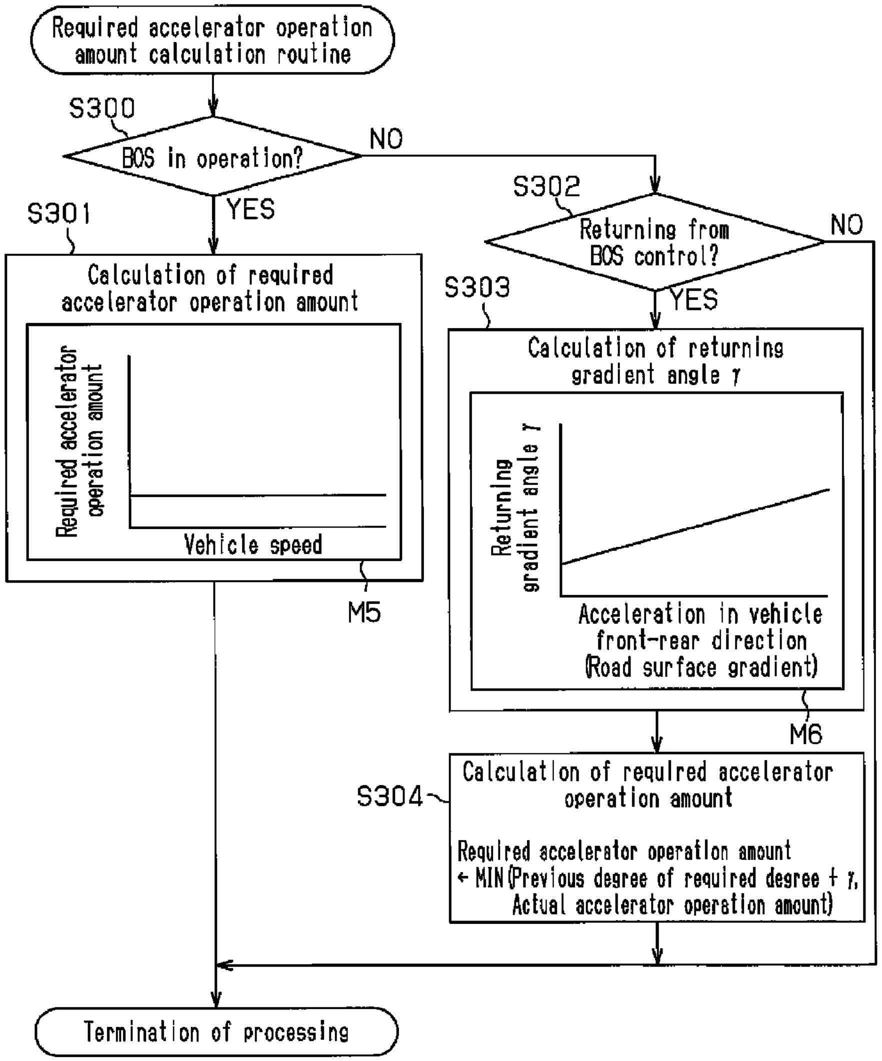
FIG. 7 is a flowchart showing a processing procedure of a required accelerator operation amount calculation routine employed in a control device for a vehicle according to a fourth embodiment of the present invention.

In the present embodiment, the BOS 1 calculates a required accelerator operation amount through processing of a required accelerator operation amount calculation routine shown in FIG. 7. Further, the processing of this routine is configured to be carried out by the BOS 1 repeatedly at every specified control cycle.

After the processing of this routine is started, first, whether the BOS control is being performed, that is, whether the BOS 1 in response to the simultaneous operation of the accelerator and the brake is in operation is determined at step S300. If the BOS 1 is in operation here (S300: YES), a calculation of the required accelerator operation amount corresponding to the vehicle speed is performed at step S301. The calculation of the required accelerator operation amount corresponding to the vehicle speed is performed with reference to a calculation map M5 showing a correspondence relationship between the vehicle speed and the required accelerator operation amount. Upon calculation of the required accelerator operation amount, the processing of this routine this time is terminated.

If the BOS 1 is not in operation (S300: NO), on the other hand, whether the processing is in the course of returning from the BOS control, that is, whether the processing is in the course of returning of the required accelerator operation amount in response to cancellation of the simultaneous operation of the accelerator and the brake is determined at step S302. If in the course of returning from the BOS control here (S302: YES), the processing moves on to step S303. If not (S302: NO), the processing of this routine this time is terminated. Further, if not in the course of returning, a value of the actual accelerator operation amount is set as a value of the required accelerator operation amount as it is.

After the processing moves on to step S303, a calculation of a returning gradient angle γ that corresponds to the acceleration in the vehicle front-rear direction is performed at this step S303. The calculation of the returning gradient angle γ is performed with reference to a calculation map M6 showing a correspondence relationship between the acceleration in the vehicle front-rear direction and the returning gradient angle γ. The larger the acceleration in the vehicle front-rear direction, that is, the larger the gradient of a road surface on which the vehicle is located, the larger the value is set as a value of the returning gradient angle γ.

Subsequently, a calculation of the required accelerator operation amount is performed at step S304. As a value of the required accelerator operation amount to be calculated here, the smaller value of a value obtained by adding the returning gradient angle γ having been calculated at step S303 to the value of the required accelerator operation amount having been calculated at the previous control cycle and the actual accelerator operation amount is set. After that, the processing of this routine this time is terminated.

Next, operation of the present embodiment will be described with reference to FIG. 8.

Figure 8:
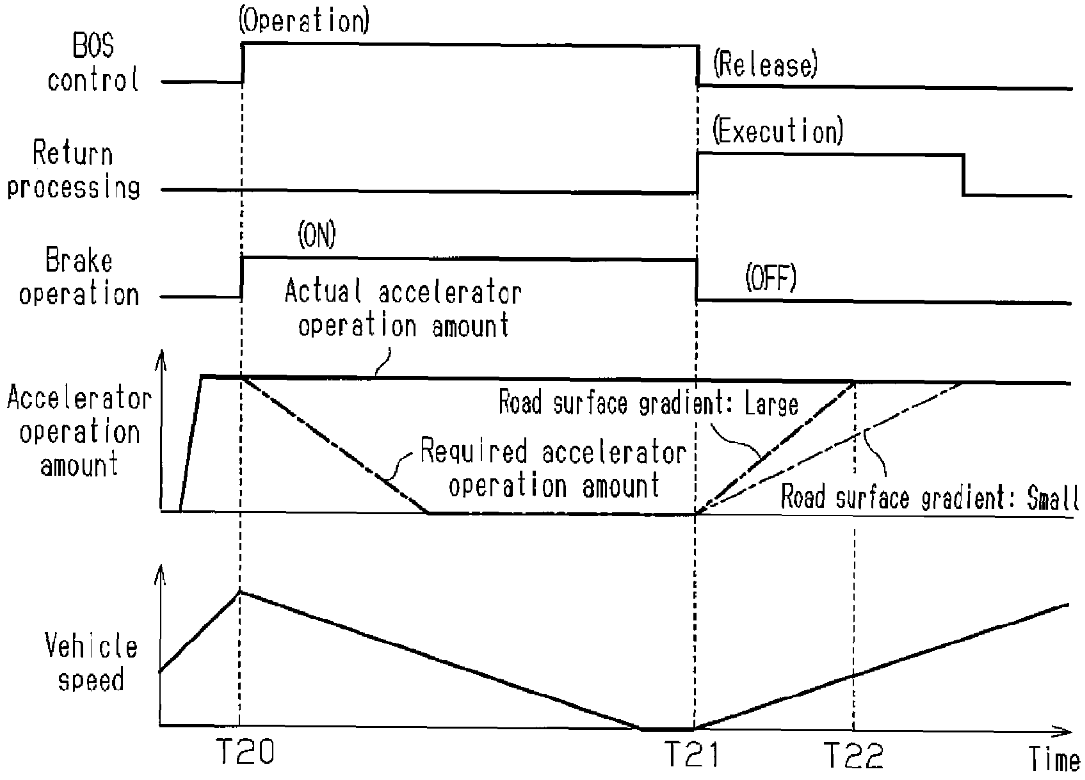
FIG. 8 is a time chart showing an example of control modes of the fourth embodiment.

After the simultaneous operation of the accelerator and the brake is performed and the BOS control is started by the start of brake operation at time T20 of FIG. 8, the required accelerator operation amount is reduced to a value smaller than the actual accelerator operation amount. With this, the throttle opening degree is decreased, and the output of the engine and furthermore the drive force of the vehicle are made smaller than values corresponding to the actual accelerator operation amount, and the brake overrides the accelerator. As a result, the vehicle speed decreases thereafter.

After the brake operation is released and the BOS control is cancelled at time T21, which is after the stopping of the vehicle, a return processing for returning the reduced required accelerator operation amount to the actual accelerator operation amount is started. In the present embodiment, the returning gradient angle γ is set in accordance with the road surface gradient having been learned from the acceleration in the vehicle front-rear direction, whereby an increasing gradient of the required accelerator operation amount in this return processing is changed in accordance with the road surface gradient. Specifically, the larger the road surface gradient, the larger the increasing gradient of the required accelerator operation amount in the return processing is made. Consequently, in the present embodiment, the required accelerator operation amount and furthermore the drive force are increased rapidly on a slope, and starting performance is improved.

After that, the return processing of the required accelerator operation amount is terminated at time T22 at which the required accelerator operation amount has increased to the same value as the actual accelerator operation amount, thereafter returning to the normal control.

In accordance with the foregoing present embodiment, the following advantages are achieved.

(4) In the present embodiment, the degree of returning of the required accelerator operation amount to the actual accelerator operation amount, that is, the degree of returning of the drive force to a value corresponding to the actual accelerator operation amount, at the time when the simultaneous operation of the accelerator and the brake is canceled is configured to be changed in accordance with the road surface gradient having been learned from the acceleration in the vehicle front-rear direction. In this respect, in the present embodiment, the degree of returning of the required accelerator operation amount is changed in accordance with the road surface gradient, so that the response speed of the drive force after the cancellation of the BOS control can be changed in accordance with the gradient of the road surface. On the other hand, a reduction range of the required accelerator operation amount under the BOS control, that is, a reduction range of the drive force under the BOS control can be kept large, so that it is also possible to satisfy stopping performance under the BOS control. Thus, according to the present embodiment, both slope starting performance and stopping performance can be achieved.

Each of the embodiments described above may be modified as follows.

In the third embodiment, the change in the degree of decrease of the required accelerator operation amount corresponding to the road surface gradient under the BOS control, that is, the change in the degree of reduction of the drive force corresponding to the road surface gradient under the BOS control is configured to be made only when the vehicle speed is not more than the preset value β. However, as long as stopping performance under the BOS control can be sufficiently ensured, the change in the degree of decrease of the required accelerator operation amount corresponding to the road surface gradient under the BOS control or of the degree of reduction of the drive force in accordance with the road surface gradient under the BOS control may be made regardless of the vehicle speed.

In the foregoing embodiments, the road surface gradient is configured to be learned from the acceleration in the vehicle front-rear direction having been detected by the acceleration sensor. However, the road surface gradient may be learned based on other information such as road surface information having been obtained from a car navigation system.

In the foregoing embodiments, the output of the engine and furthermore the drive force of the vehicle are configured to be controlled by controlling the opening degree of the throttle valve 3 in accordance with the required accelerator operation amount. However, the drive force of the vehicle may be configured to be controlled by controlling other engine control parameters such as a fuel injection amount in accordance with the required accelerator operation amount. As for an electric vehicle, which travels by a motor, similar control over the drive force can be performed by controlling the output of the motor in accordance with the required accelerator operation amount. In addition, for a hybrid vehicle equipped with an engine and a motor as driving sources, similar control over the drive force can be performed by controlling the gross output of the engine and the motor in accordance with the required accelerator operation amount.

Description of the Reference Numerals

1 . . . brake override system (BOS), 2 . . . throttle controller, 3 . . . throttle valve.

The invention claimed is:

1. A control device for a vehicle, comprising:

an electronic control unit (ECU), wherein, at a time of simultaneous operation of an accelerator and a brake, the ECU is configured to control an engine to make a required accelerator operation amount used for controlling a drive force smaller than an actual accelerator operation amount, wherein when the simultaneous operation is canceled along with maintaining the accelerator operation and cancelling the braking operation, the ECU is configured to implement a return of the required accelerator operation amount to the actual accelerator operation amount firstly by implementing a specified amount of increase in the required accelerator operation amount at the time of starting the return of the required accelerator operation amount, and secondly by gradually increasing the required accelerator operation amount.

2. The control device for the vehicle according to claim 1, wherein the ECU is configured to change the specified amount of increase in the required accelerator operation amount in accordance with a gradient of a road surface on which the vehicle is located.

3. The control device for the vehicle according to claim 1, wherein the ECU is configured to change the specified amount of increase in the required accelerator operation amount in accordance with acceleration in a vehicle front-rear direction acting upon the vehicle.

* * * * *